(12) United States Patent
Malloy et al.

(10) Patent No.: US 8,729,428 B1
(45) Date of Patent: May 20, 2014

(54) WELDING ROD EXPANDER ASSEMBLY

(76) Inventors: Patrick Malloy, Cookstown, NJ (US);
Norma J Malloy, Cookstown, NJ (US)

( * ) Notice: Subject to any disclaimer, the term of this patent is extended or adjusted under 35 U.S.C. 154(b) by 99 days.

(21) Appl. No.: 13/472,376

(22) Filed: May 15, 2012

Related U.S. Application Data

(63) Continuation-in-part of application No. 12/603,193, filed on Oct. 21, 2009, now abandoned.

(60) Provisional application No. 61/107,710, filed on Oct. 23, 2008.

(51) Int. Cl.
*B23K 9/28* (2006.01)

(52) U.S. Cl.
USPC .......................................... 219/144; 219/138

(58) Field of Classification Search
USPC ................ 219/70, 69.1, 144, 145.1, 138, 139
See application file for complete search history.

(56) References Cited

U.S. PATENT DOCUMENTS

| | | | | |
|---|---|---|---|---|
| 2,039,167 A * | 4/1936 | Hopkins | ....................... | 313/355 |
| 2,067,995 A * | 1/1937 | Varner et al. | ................... | 219/144 |
| 2,277,894 A * | 3/1942 | Welsh | ........................... | 219/144 |
| 2,324,924 A * | 7/1943 | Hall | .............................. | 219/144 |
| 2,350,426 A * | 6/1944 | Thompson | .................... | 219/144 |
| 2,376,943 A * | 5/1945 | Smith | ........................... | 219/144 |
| 2,498,241 A | 2/1950 | Bowen et al. | | |
| 3,219,793 A * | 11/1965 | Mahoney | ....................... | 219/144 |
| 4,071,733 A * | 1/1978 | Pishioneri | ...................... | 219/141 |
| 4,142,086 A * | 2/1979 | Rotilio | .............................. | 219/75 |
| 4,194,107 A | 3/1980 | Klasson | | |
| 4,588,252 A | 5/1986 | Ice | | |
| 4,820,901 A * | 4/1989 | Peviani | .......................... | 219/138 |
| 5,885,035 A * | 3/1999 | Hoffschneider | ........... | 407/29.15 |
| 6,444,951 B1 * | 9/2002 | Paxton et al. | .................. | 219/138 |
| 2007/0284354 A1 * | 12/2007 | Laymon | ................... | 219/137.51 |
| 2010/0116803 A1 * | 5/2010 | Gelmetti | ........................ | 219/138 |

* cited by examiner

*Primary Examiner* — Dana Ross
*Assistant Examiner* — John J Norton

(57) ABSTRACT

One embodiment of a welding rod expander assembly is useful for expanding a welding rod to a remote location. The welding rod expander assembly may include a first attachment member, a second attachment member, at least one elongated member and a welding rod holder. The second attachment member may be pivotally carried by the first attachment member. Further the at least one elongated member may have an external threaded end portion and a connecting end portion. The welding rod holder may be carried by the second attachment member. The welding rod holder may include a holding unit carried by the second internal threaded portion. The holding unit may be capable of receiving the welding rod. The welding rod holder may further include a clamping unit disposed on the second internal threaded portion. Further, the welding rod secured in the holding unit may be capable of expanding to the remote location.

16 Claims, 7 Drawing Sheets

WELDING ROD EXPANDER ASSEMBLY

CROSS-REFERENCE TO RELATED APPLICATION

The present application is a Continuation-in-Part (CIP) related to and claims priority from prior provisional application Ser. No. 61/107,710 filed on Oct. 23, 2008, and pending non-provisional application Ser. No. 12/603,193 filed Oct. 21, 2009 which applications are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of arc welding tools, and more particularly, to a welding rod expander assembly adapted to expand a welding rod to a remote location.

2. Description of the Related Art

Arc welding, more specifically, shielded metal arc welding (SMAW), employs an electric arc to melt a work material and a welding rod to lay a weld. An electric current forms the electric arc between the electrode (welding rod) and the work material to be welded.

The welding procedure is dependent on the electrode rod, composition of the work material, and location of a joint to be welded. Minimal skill is required for welding a flat joint. Further, welding the flat joint may be done with a welding rod that may melt quickly but solidify slowly. However, welding sloped, vertical or upside-down joint, termed "out of position," takes steady hands and an eye for detail. Further, welding joints at a remote location i.e., an inaccessible location is a cumbersome process and also associated with risk to life and limb. In order to weld a joint at the remote location, a welder may have to periodically stop the welding procedure in order to stretch to the remote location. Further, the welder may have to first weld more than one welding rod together to increase the length of the welding rod in order to make the welding rod reach the remote location. Such an extended welding rod may be subjected to breakage which may present a greater danger to the welder.

A welder will often need to make a weld in a location that he is not able to fit into, or easily see the area needing to be welded. Sometimes there is not even enough space for the welder's face shield to fit into. A common practice that welders employ in these situations is to bend the welding rod at 45 degrees or greater to be able to perform the weld at the correct angle. The end of the rod must be the correct distance from the joint to be welded and must also be at a correct angle to the work piece. This is even more critical in out of position welding. An incorrect weld angle on an out of position work piece will tend to undercut the parent metal and trap slag, resulting in a bad weld. When a welder bends the welding rod to make a weld, flux is broken off of the welding rod leaving bare metal around the bent area, and creating greatly increased chances of arcing to an unintended object.

A second problem with this practice is that each rod that is bent looses approximately 60 percent of the length of the weld it could have made. The waste increases cost and creates a greater chance for inclusions of slag into the weld because the welder has to stop and start several more times than he would have if he had been able to burn the whole length of rod. It is when a welder starts and when he stops a welding arc that he has a very high probability of trapping slag deep into the weld weakening the welded joint. When a welder has to bend rods to achieve the correct angle, he also multiplies the chances of a bad weld because of the increased amount of starts and stops. The electrode holder is designed to clamp the electrode at various angles to the holder, but very often the angle needs to be made at a distance from the clamp. Existing clamps are not designed for this. A cost effective and innovative solution to the problem is needed.

Various attempts have been made to solve the above-mentioned problems such as those found in U.S. Pat. Nos. 6,444,951; and 4,588,252; 3,219,793; 4,194,107; 2,324,924; and 2,498,241. This prior art is representative of electrode holders. None of the above inventions and patents, taken either singly or in combination, is seen to describe the invention as claimed.

Ideally, an electrode holder would allow the electrode to be adjustably lengthened and angled at various distances from the hand of the user, and yet, would operate reliably and be manufactured at a modest expense. Thus, a need exists for a reliable welding rod expander assembly to allow the welder work using proper welding practices and to avoid the above-mentioned problems.

BRIEF SUMMARY OF THE INVENTION

In view of the foregoing disadvantages inherent in the known arc welding tool art, the present invention provides a novel welding rod expander assembly. The general purpose of the present invention, which will be described subsequently in greater detail, is to provide the ability to extend the electrode at a greater distance from the user and to have the ability to angle the electrode at various distances from the hand of the user.

In one embodiment of a welding rod expander assembly for expanding a welding rod to a remote location the welding rod expander assembly may be adapted to be carried by a stinger. The welding rod expander assembly may include a first attachment member, a second attachment member, at least one elongated member and a welding rod holder. The first attachment member may have a first internal threaded portion and a first attachment portion.

The second attachment member may have a second internal threaded portion and a second attachment portion. The second attachment portion may be pivotally carried by the first attachment portion. Further, the at least one elongated member may have an external threaded end portion and a connecting end portion. The external threaded end portion may be capable of being removably carried by the first internal threaded portion and the connecting end portion may be capable of being removably carried by the stinger. The connecting end portion may also be a male quick disconnect capable of being removably carried by a female quick disconnect for quick coupling and uncoupling of the assembly in preferred embodiments. Furthermore, the welding rod holder may be carried by the second attachment member. The welding rod holder may include a holding unit carried by the second internal threaded portion. The holding unit may be capable of receiving the welding rod. The welding rod holder may further include a clamping unit disposed on the second internal threaded portion. The clamping unit may be capable of assuming at least one of an open position and a closed position. In the open position, the clamping unit may be capable of securing the welding rod in the holding unit. Further, the welding rod secured in the holding unit may be capable of expanding to the remote location.

The present invention holds significant improvements and serves as a welding rod expander assembly. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, welding rod expander assembly, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to an electrode holder device and more particularly to a welding rod expander assembly as used to improve the ability of the welder to perform work using proper welding practices.

The exemplary embodiments described herein provide detail for illustrative purposes and are subject to many variations in structure and design. It should be emphasized, however, that the present disclosure is not limited to a particular welding rod expander assembly, as shown and described. It is understood that various omissions and substitutions of equivalents are contemplated as circumstances may suggest or render expedient, but these are intended to cover the application or embodiment without departing from the spirit or scope of the claims of the present disclosure. Also, it is to be understood that the phraseology and terminology used herein are for the purpose of description and should not be regarded as limiting.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item.

Generally speaking, the present disclosure provides a welding rod expander assembly for expanding a welding rod to a remote location. The term "welding rod" as used herein relates to a consumable electrode coated in flux utilized during a welding procedure.

The term "stinger" as used herein relates to a conventional welding tool utilized for holding the welding rod.

Figure 1:
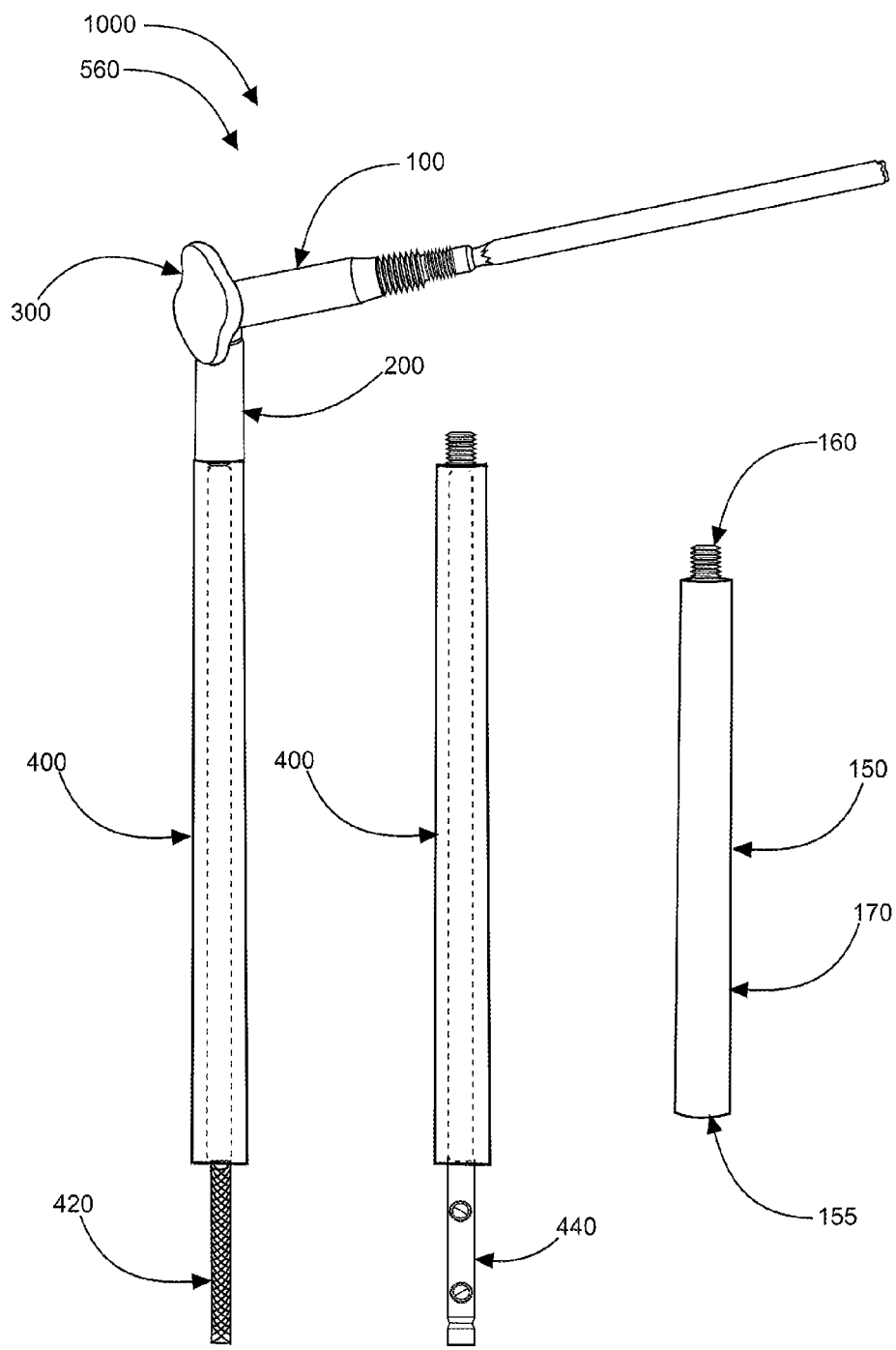
FIG. 1 shows a perspective view of an embodiment of a welding rod expander assembly.

Referring to FIG. 1, one embodiment of a welding rod expander assembly 1000 is shown, that may be adapted to be mounted to a conventional stinger (not shown) employed in a welding operation.

Figure 2:
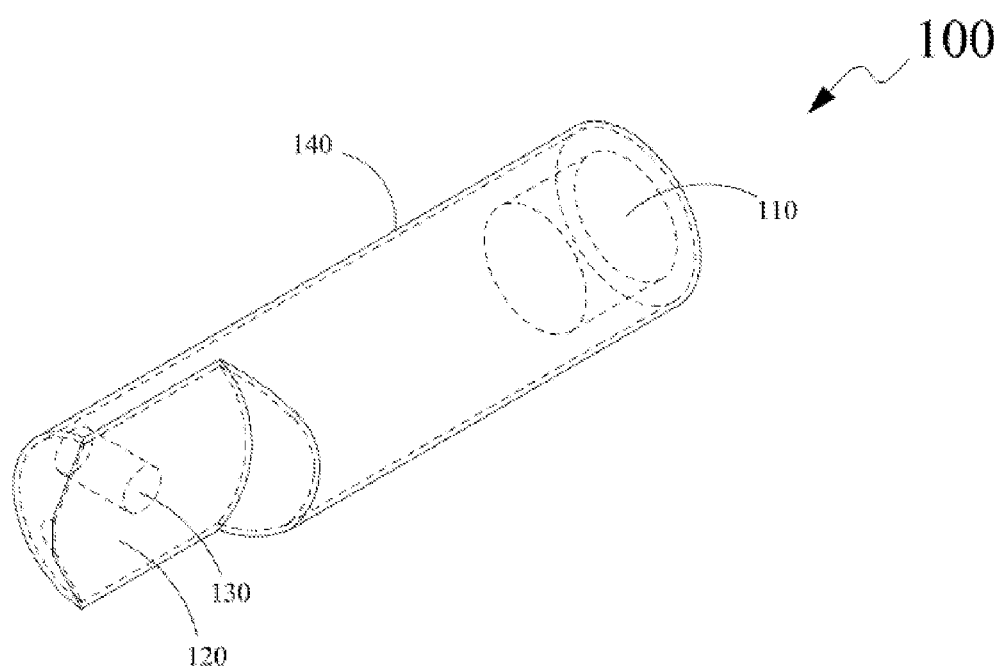
FIG. 2 is a perspective view of a first attachment member of the welding rod expander assembly of FIG. 1.

Referring to FIGS. 1 and 2, the welding rod expander assembly 1000 may include a first attachment member 100 having a first internal threaded portion 110 and a first attachment portion 120. The first attachment portion 120 may include a first threaded opening 130. Further, the first attachment member 100 may be covered by a first insulated covering 140 configured to withstand extreme heat generated during welding operation. The first attachment member 100 may be made of any heat resistant and durable material such as copper, and the like.

The first attachment member 100 and the second attachment member 200 may comprise brass and the first threaded opening 130 of the first attachment member 100 and the second threaded opening 230 of the second attachment member 200 may further comprise threaded steel inserts to prevent stripping of the threads. The welding rod expander assembly 1000 may also have an extension member 150 having a first end 155 and a second end 160, the first end 155 threadably coupleable with the external threaded end portion 410 of the elongated member 400 and the second end 160 of extension member 150 is threadably coupleable with the first internal threaded portion 110. The extension member 150 may comprise a non-conductive covering 170 capable of withstanding extreme heat. The extension member 150 may comprise about 5 inches in length however multiple extension members 150 of various lengths may be threadably joined to extend the welding rod holder 500 up to six feet away from the stinger, or to a user preferred length.

Figure 3:
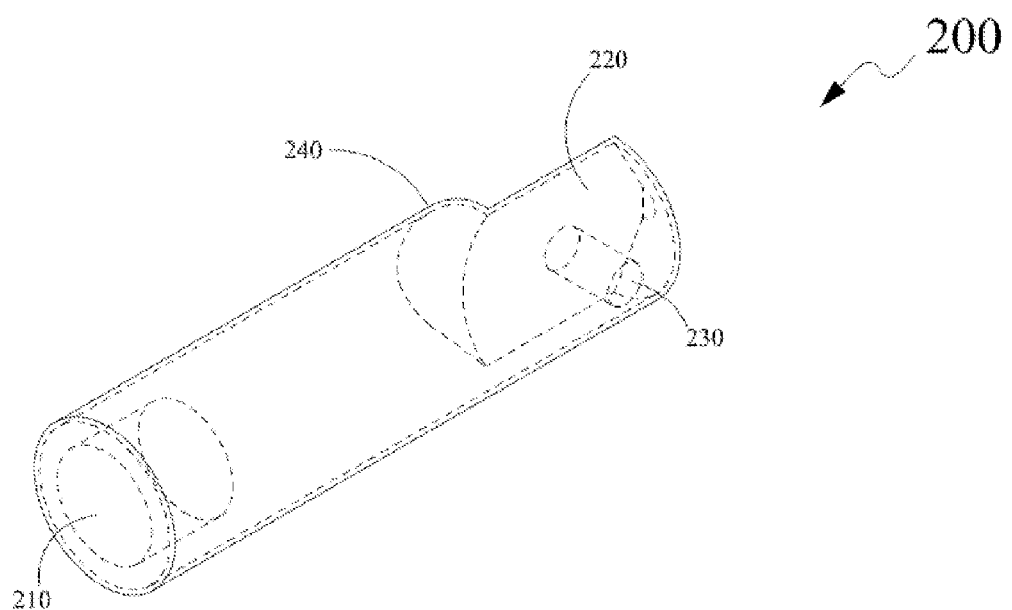
FIG. 3 is a perspective view of a second attachment member of the welding rod expander assembly of FIG. 1.

Referring now to FIGS. 1 and 3, the welding rod expander assembly 1000 may include a second attachment member 200 having a second internal threaded portion 210 and a second attachment portion 220. The second attachment portion 220 may include a second threaded opening 230. Further, the second attachment member 200 may be covered by a second insulated covering 240 configured to withstand extreme heat generated during welding operation(s). The second attachment member 200 may be made of any heat resistant and durable material such as copper, and the like.

Figure 4:
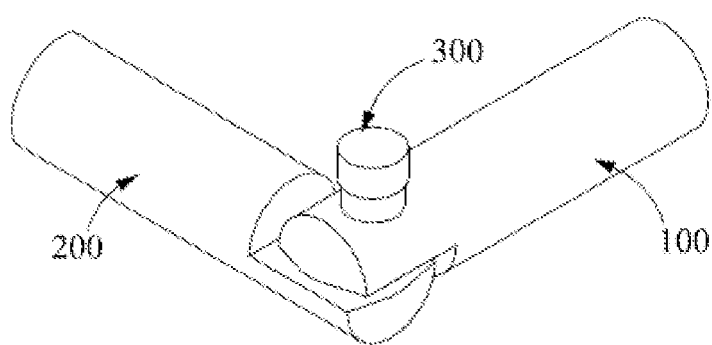
FIG. 4 is a perspective view of the second attachment member carried by the first attachment member of the welding rod expander assembly of FIG. 1.

Further, as shown in FIGS. 1 and 4, the second attachment member 200 may pivotally carry the first attachment member 100. More specifically, the first threaded opening 130 may be aligned with the second threaded opening 230 and the first threaded opening 130 and the second threaded opening 230 may be secured by a fastening member 300, in order to allow the first attachment member 100 and the second attachment member 200 to swivel from about 0 degree to 175 degrees. In an embodiment of the present disclosure, the fastening member 300 is a thumbscrew. However, it will be pertinent to mention here that the thumbscrew has been mentioned for purpose of illustration only and may not be construed as limiting the scope of present disclosure.

Figure 5:
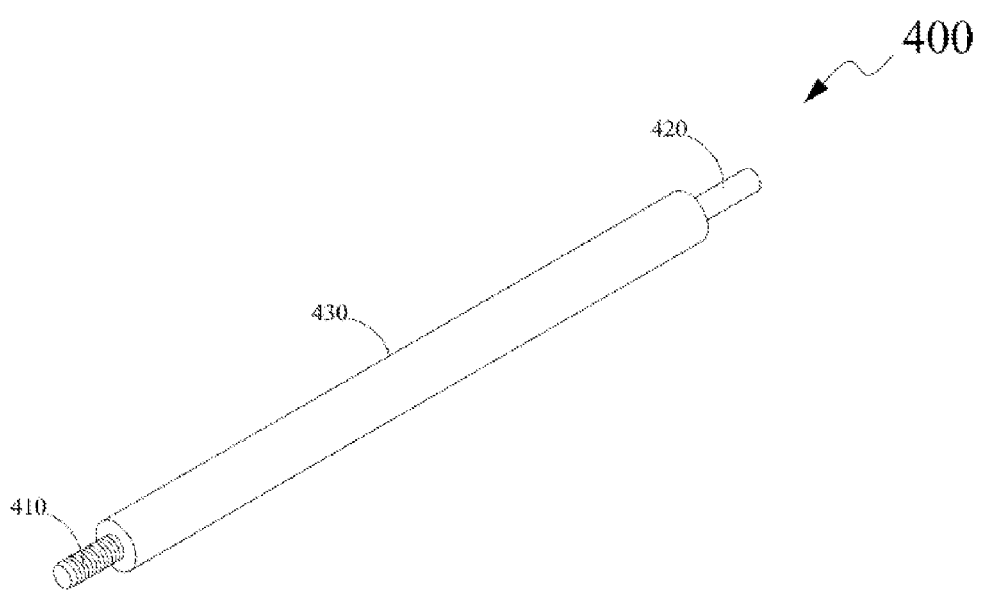
FIG. 5 is an elongated member of the welding rod expander assembly of FIG. 1.

Referring to FIGS. 1 and 5, the welding rod expander assembly 1000 may further include at least one elongated member, such as an elongated member 400. The elongated member 400 may include an external threaded end portion 410 and a connecting end portion 420. The external threaded end portion 410 may be carried by the first internal threaded portion 110 and the connecting end portion 420 may be carried by the stinger. The connecting end portion 420 may alternately be a male quick-disconnect portion 440 of a quick-disconnect coupling. In a preferred embodiment, the connecting end portion 420 of the elongated member comprises a knurled surface for a non-slip grip by the stinger. The elongated member 400 may be made of any sturdy and heat resistant material such as alloy 182, chromium, copper and the like. Further, the elongated member 400 may be covered by a third insulated covering 430 configured to withstand extreme heat generated during welding operation. Furthermore, more than one elongated members such as the elongated member 400 may be joined together in order to increase the overall length of the welding rod expander assembly 1000.

Figure 6:
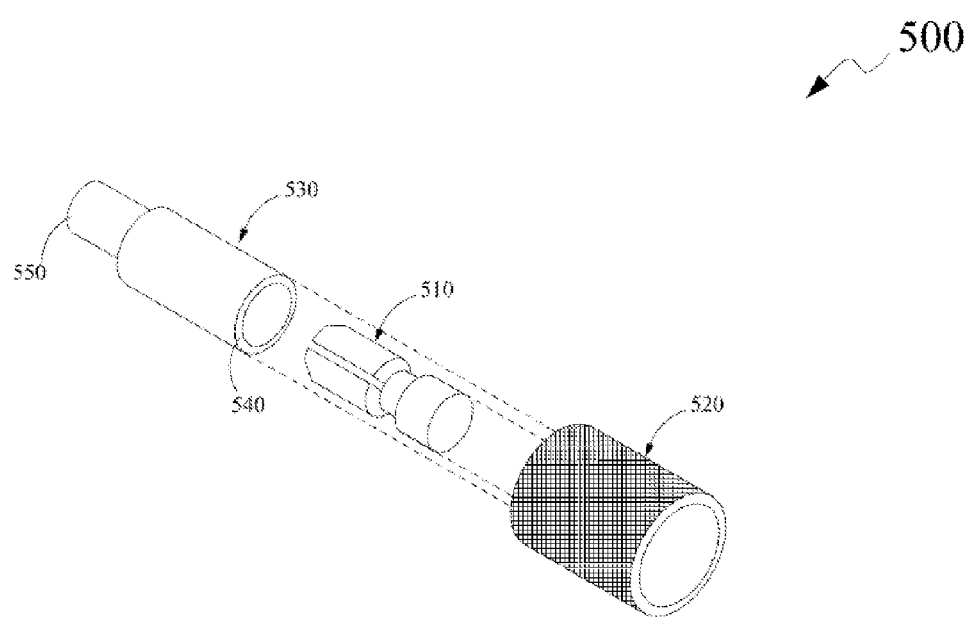
FIG. 6 is an exploded view of a welding rod holder of the welding rod expander assembly of FIG. 1.

Now referring to FIGS. 1 and 6, the welding rod expander assembly 1000 may include a welding rod holder 500 having a holding unit 510 and a clamping unit 520. The welding rod holder 500 may be carried by the second attachment member 200. More specifically, the holding unit 510 may be carried by the second internal threaded portion 210 and the clamping unit 520 may be disposed on the second internal threaded portion 210. An example of the holding unit 510 may be a collet. Further, the clamping unit 520 may be capable of assuming at least one of an open position and a closed position. More specifically, in the open position, the clamping unit 520 may secure the welding rod carried by the holding unit 510 in a manner such that the welding rod may be incapable of disengaging from the welding rod holder 500.

In the closed position, the welding rod may be capable of being released from the holding unit 510. The holding unit 510 and the clamping unit 520 may be made of a material which may be capable of withstanding the extreme heat generated during the welding procedure. In an embodiment of the present disclosure, the holding unit 510 may be made of alloy 510, phosphor bronze, and the like and the clamping unit 520 may be made of G10/FR4 garlite material, and the like. However, it may be evident that the material of construction of the holding unit 510 and the clamping unit 520 has been shown here for purpose of illustration and may not be construed as limiting the scope of the present disclosure.

Further, the welding rod expander assembly 1000 may include a shielding member 530 carried by the welding rod holder 500. The shielding member 530 may include a first open end 540 and a second open end 550. The first open end 540 may be disposed in the clamping unit 520 in a manner such that the holding unit 510 may be surrounded by the shielding member 530. Further, the second open end 550 may be capable of allowing the welding rod to pass there through such that the welding rod is received in the holding unit 510. The shielding member 530 may be made of a material which is capable of withstanding extreme heat. An example of the material used for the construction of the shielding member 530 may be porcelain or may be a ceramic cup. However, it may be evident that the material of construction of the shielding member 530 has been shown here for purpose of illustration and may not be construed as limiting the scope of the present disclosure.

In use, the welding rod expander assembly 1000 may be capable of being carried by a stinger employed during the welding procedure. More specifically, the connecting end portion 420 of the elongated member 400 may be capable of being carried by the stinger. Further, the welding rod may be capable of being carried by the welding rod expander assembly 1000 in a manner such that the welding rod may be received by the welding rod holder 500. Further, the clamping unit 520 may assume at least one of an open position and a closed position. More specifically, in the open position, the clamping unit 520 may secure the welding rod carried by the holding unit 510 in a manner such that the welding rod may be incapable of disengaging from the welding rod holder 500. Further, the open position of the clamping unit 520 may be capable of expanding the welding rod to a remote location. More specifically, the welding rod expander assembly 1000 may be employed for making the welding rod to reach to the remote location which is substantially inaccessible. After the welding operation has been conducted or to release the welding rod from the welding rod holder 500, the clamping unit 520 is worked upon to release the welding rod from the holding unit 510 such that the clamping unit 520 may assume the closed position.

The welding rod expander assembly 1000 may be beneficial for making the welding rod reach remote locations during welding operations. Specifically, the welding rod expander assembly precludes the need of combining more than one welding rod for reaching remote locations. Further, the welding rod expander assembly provides a means for reaching remote locations without compromising safety of a welder. Further, various components of the welding rod expander assembly may withstand extreme heat generated during the welding procedure and as such assist the welder to conduct the welding procedure for extended period of time. Furthermore, the welding rod expander assembly may be simple in construction and easy to use.

Showing welding rod expander assembly 1000. Welding rod expander assembly 1000 may be sold as kit 560 comprising the following parts: at least one welding rod holder; at least one first attachment member; at least one second attachment member; at least one fastening member; at least one elongated member; at least one extension member; and at least one set of user instructions. Welding rod expander assembly 1000 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different extension combinations, parts may be sold separately, etc., may be sufficient.

Figure 7:
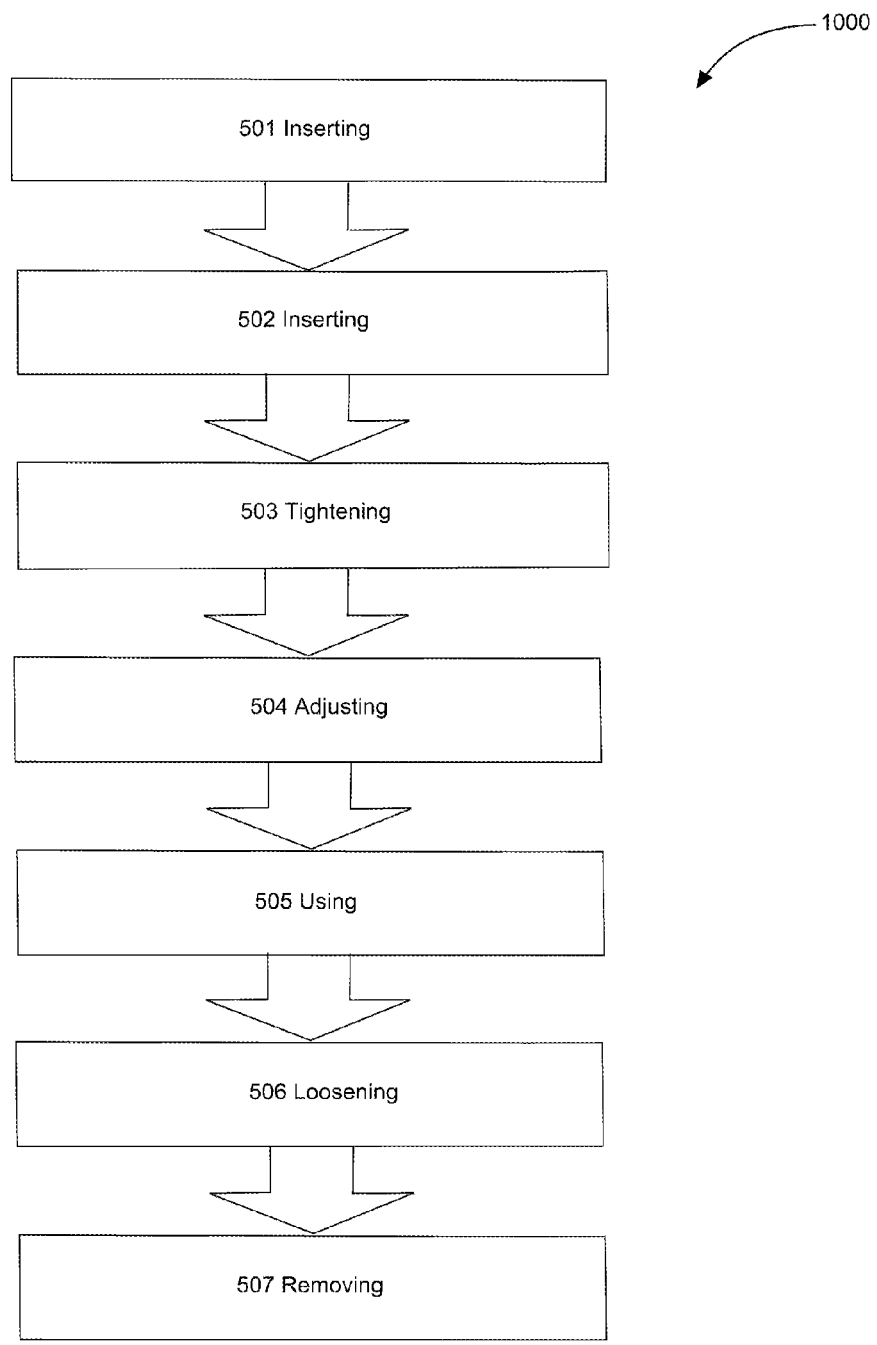
FIG. 7 is a flowchart illustrating a method of use for the welding rod expander assembly of FIGS. 1-6.

Referring now to FIG. 7, showing a flowchart illustrating a method of use for a welding rod expander assembly 1000 according to an embodiment of the present invention of FIGS. 1-6.

A method of use for welding rod expander assembly 1000 may comprise the steps of: step one 501, inserting the connecting end portion of an assembled welding rod expander assembly into a stinger; step two 502, inserting a welding electrode into the welding rod holder; step three 503, tightening the clamping unit to grip a non-fluxed end of a welding electrode; step four 504, adjusting an angle between the first attachment member and the second attachment member and tightening the fastening member; step five 505, using the welding rod expander assembly to burn the welding electrode; and step six 506, loosening the fastening member and removing the unconsumed portion the welding electrode; and step seven 507, removing the welding rod expander assembly from the stinger.

It should be noted that step 507 is an optional step and may not be implemented in all cases. Optional steps of method are illustrated using dotted lines in FIG. 7 so as to distinguish them from the other steps of method 500.

It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A welding rod expander assembly for expanding a welding rod to a remote location, the welding rod expander assembly adapted to be carried by a stinger, the welding rod expander assembly comprising:
   a first attachment member having a first internal threaded portion and a first attachment portion;
   a second attachment member having a second internal threaded portion and a second attachment portion, the second attachment portion pivotally carried by the first attachment portion;
   at least one elongated member having an external threaded end portion and a connecting end portion, the external threaded end portion capable of being removably carried by the first internal threaded portion and the connecting end portion capable of being removably carried by the stinger; and
   a welding rod holder carried by the second attachment member, the welding rod holder comprising a holding unit carried by the second internal threaded portion, the holding unit capable of receiving the welding rod, and
   a clamping unit disposed on the second internal threaded portion, the clamping unit capable of assuming at least one of an open position and a closed position,
   wherein the clamping unit is capable of securing the welding rod in the holding unit, and
   wherein the welding rod secured in the holding unit is capable of expanding to the remote location.

2. The welding rod expander assembly of claim 1 further comprising a shielding member having a first open end and a second open end, the first open end capable of being threadably carried by the welding rod holder and the second open end capable of allowing the welding rod to pass there through.

3. The welding rod expander assembly of claim 1, wherein the second attachment portion is pivotally carried by the first attachment portion by a fastening member.

4. The welding rod expander assembly of claim 3, wherein the fastening member is a thumbscrew.

5. The welding rod expander assembly of claim 1, wherein the first attachment member is covered with a first insulated covering.

6. The welding rod expander assembly of claim 1, wherein the second attachment member is covered with a second insulated covering.

7. The welding rod expander assembly of claim 1, wherein the at least one elongated member is covered with a third insulated covering.

8. The welding rod expander assembly of claim 2 wherein the shielding member comprises a ceramic cup.

9. The welding rod expander assembly of claim 1 wherein the holding unit comprises a collet.

10. The welding rod expander assembly of claim 1 further comprising an extension member having a first end and a second end, the first end threadably coupleable with the external threaded end portion of the elongated member and the second end of extension member is threadably coupleable with the first internal threaded portion.

11. The welding rod expander assembly of claim 10 wherein the extension member comprises a non-conductive covering.

12. The welding rod expander assembly of claim 10 wherein the extension member is about 5 inches in length.

13. The welding rod expander assembly of claim 10 wherein at least one extension member is able to be threadably coupled together to extend the length of the welding rod expander assembly to a user preferred length.

14. The welding rod expander assembly of claim 1 wherein the first attachment member and the second attachment member comprise brass.

15. The welding rod expander assembly of claim 14 wherein the first threaded opening of the first attachment member and the second threaded opening of the second attachment member further comprise threaded steel inserts.

16. The welding rod expander assembly of claim 1 wherein the connecting end portion of the elongated member comprises a knurled surface.

* * * * *